US012458886B2

(12) United States Patent
Amimoto

(10) Patent No.: US 12,458,886 B2
(45) Date of Patent: Nov. 4, 2025

(54) SERVER DEVICE, INFORMATION PROCESSING DEVICE, AND INFORMATION PROVIDING METHOD

(71) Applicant: Sony Interactive Entertainment Inc., Tokyo (JP)

(72) Inventor: Tatsuki Amimoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 287 days.

(21) Appl. No.: 18/327,964

(22) Filed: Jun. 2, 2023

(65) Prior Publication Data

US 2023/0405462 A1 Dec. 21, 2023

(30) Foreign Application Priority Data

Jun. 14, 2022 (JP) ................................ 2022-095539

(51) Int. Cl.
*A63F 13/537* (2014.01)
*A63F 13/35* (2014.01)

(52) U.S. Cl.
CPC ............ *A63F 13/537* (2014.09); *A63F 13/35* (2014.09)

(58) Field of Classification Search
None
See application file for complete search history.

(56) References Cited

U.S. PATENT DOCUMENTS

| | | | | |
|---|---|---|---|---|
| 11,369,881 | B2 | 6/2022 | Spencer | |
| 12,115,455 | B2 * | 10/2024 | Nishikawa | A63F 13/69 |
| 2010/0113162 | A1 * | 5/2010 | Vemuri | G07F 17/3267 463/43 |
| 2014/0256447 | A1 * | 9/2014 | Woodman | A63F 13/44 463/42 |
| 2021/0121783 | A1 | 4/2021 | Spencer | |
| 2023/0364506 | A1 | 11/2023 | Ishida | |

FOREIGN PATENT DOCUMENTS

| | | | |
|---|---|---|---|
| JP | 2010154931 | A | 7/2010 |
| JP | 2018000623 | A | 1/2018 |
| JP | 2021049249 | A | 4/2021 |
| JP | 2021065699 | A | 4/2021 |
| JP | 2022063754 | A | 4/2022 |
| JP | 2022063756 | A | 4/2022 |

OTHER PUBLICATIONS

Notice of Reasons for Refusal for corresponding JP Application No. 2022-095539, 9 Pages, dated Jan. 11, 2024.

* cited by examiner

*Primary Examiner* — Ronald Laneau
(74) *Attorney, Agent, or Firm* — Kilpatrick Townsend & Stockton LLP

(57) ABSTRACT

Provided is a server device including one or more processors having hardware. The one or more processors derive remaining time left until a user ends game play, specify an activity that is predicted to be completed by the user in the derived remaining time, and provide information regarding the specified activity to the user.

8 Claims, 14 Drawing Sheets

5

SERVER DEVICE, INFORMATION PROCESSING DEVICE, AND INFORMATION PROVIDING METHOD

CROSS REFERENCE TO RELATED APPLICATION

This application claims the benefit of Japanese Priority Patent Application JP 2022-095539 filed Jun. 14, 2022, the entire contents of which are incorporated herein by reference.

BACKGROUND

The present disclosure relates to a technology for providing information to a user who is playing a game.

Japanese Patent Laid-Open No. 2022-63756 discloses a server device that processes pieces of event data regarding an activity performed by a plurality of players. The server device acquires playing time periods of a plurality of players for an activity from a plurality of pieces of event data, classifies the players into any one of a plurality of classes according to the respective skill values of the players, and determines a representative value of the playing time in each class on the basis of the playing time periods of the plurality of players in each class. The server device reports, to a user, estimated playing time that is based on the representative value of the playing time associated with the class of the user.

SUMMARY

When an online live event or the like is scheduled to be held, a user can play an activity to spend an enjoyable time until the scheduled start time of the event. However, if the user becomes engaged with the activity, the user continues playing the activity after the time passes the scheduled start time of the event. In addition, if a child user, on whom an allowable playing time restriction is imposed through a parental control function, plays a time-consuming activity, the activity may not be ended within an allowable playing time in some cases.

Therefore, it is desirable to implement a technology for providing proper information regarding an activity to a user in a case where a time at which the user ends game play is determined.

According to one mode of the present disclosure, there is provided a server device including one or more processors having hardware. The one or more processors derive remaining time left until a user ends game play, specify an activity that is predicted to be completed by the user in the derived remaining time, and provide information regarding the specified activity to the user.

Another mode of the present disclosure is an information processing device that is operated by a user. The information processing device includes one or more processors having hardware. The one or more processors transmit information regarding a game play end time of a user, to a server device, acquire information regarding an activity that is predicted to be completed by the user by the end time, and display the information regarding the activity.

A yet another mode of the present disclosure is an information providing method for providing information to a user. The method includes deriving remaining time left until the user ends a game play, specifying an activity that is predicted to be completed by the user in the derived remaining time, and providing information regarding the specified activity to the user.

Note that any combination of the abovementioned constituent elements and expressions of the present disclosure converted between a method, a device, a system, a recording medium, a computer program, and the like are also effective as the modes of the present disclosure.

DETAILED DESCRIPTION OF THE PREFERRED EMBODIMENT

An outline of an embodiment of the present disclosure will be described below. In the embodiment, an information processing device which is a user terminal device executes game software. When an activity is started, the game software outputs event information that includes an activity identifier (activity ID) used for identifying an activity and information which indicates a start of the activity, to system software. An activity is one unit of game play. An activity may be a stage, a quest, a mission, or the like that is provided to a user during the progress of the game. When the activity is ended, the game software outputs event information including the activity ID and information indicating an end of the activity, to the system software. When the activity is ended, the game software may include the result (success or failure) of the activity to the event information. The system software generates event data by adding a user identifier (user account) for identifying a user, a game identifier (game ID) for identifying a game, and time information (a time stamp) to the event information output from the game software and transmits the event data to a server device.

The server device collects pieces of event data transmitted from a plurality of information processing devices operated by a plurality of players, and analyzes how the activities have been played. For example, the server device may statistically process the playing time periods of the plurality of players for the activity on the basis of the pieces of event data transmitted from the plurality of information processing devices. The server device has a function of reporting estimated playing time to a user who has not played the activity, on the basis of a result of statistical processing. Since the user is notified of the estimated playing time, the user can determine whether or not the activity will be ended within a limited time period.

Figure 1:
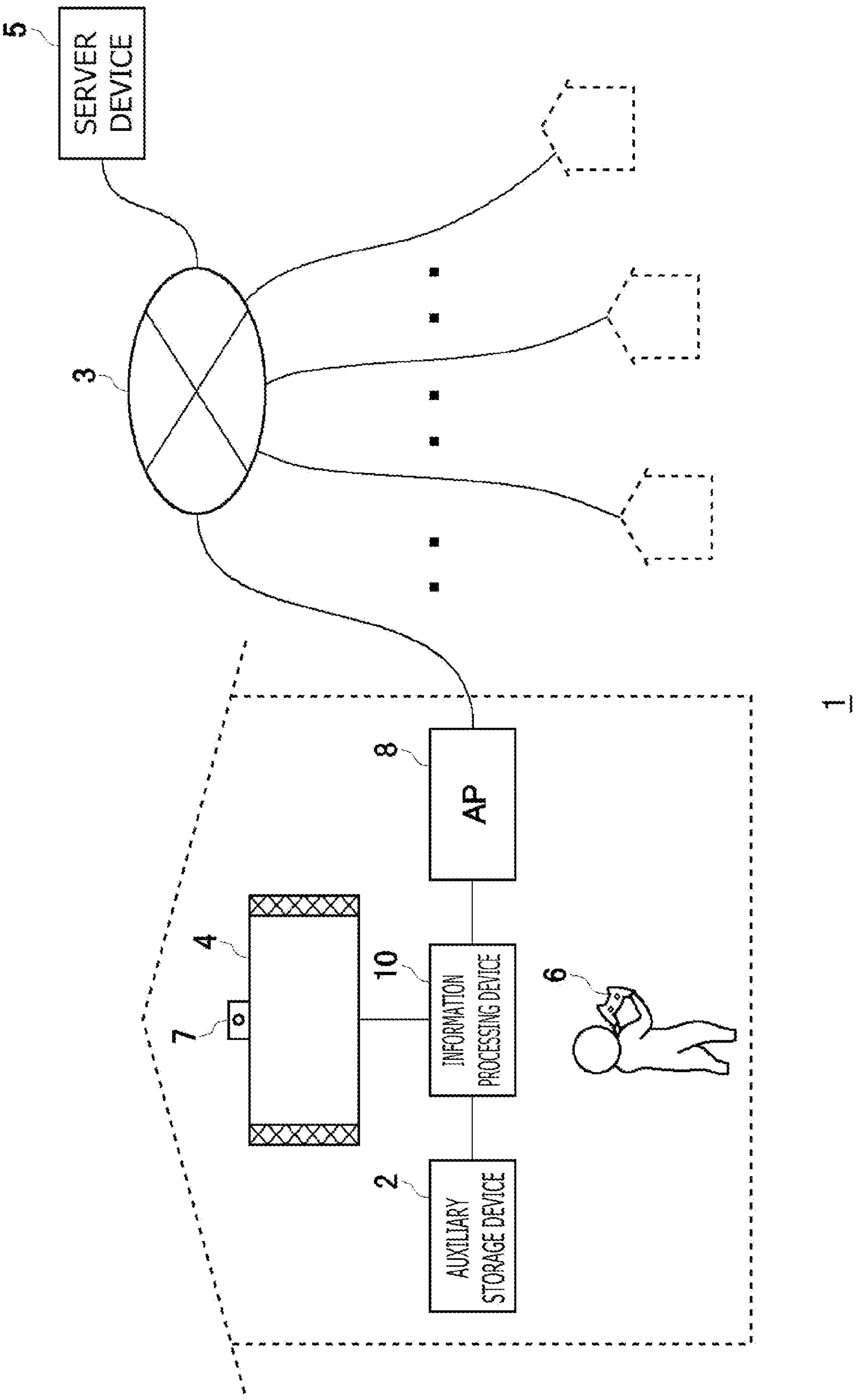
FIG. 1 is a diagram depicting an information processing system according to an embodiment of the present disclosure.

FIG. 1 depicts an information processing system 1 according to the embodiment of the present disclosure. The information processing system 1 according to the embodiment is a game system for supporting game play of users. The information processing system 1 includes an information processing device 10 operated by a user who is a player, and a server device 5. An access point (hereinafter, referred to as an "AP") 8 has a wireless access point function and a router function. The information processing device 10 establishes wireless or wired connection with the AP 8 to connect to the server device 5 on a network 3 in such a manner as to communicate with the server device 5. FIG. 1 depicts one user and one information processing device 10, but the following description is based on a premise that, in the information processing system 1, a plurality of the information processing devices 10 operated by a plurality of users are connected to the server device 5 via the network 3.

The information processing device 10 is connected wirelessly or wiredly to an input device 6 operated by a user. The input device 6 outputs information regarding an operation performed by the user to the information processing device 10. Upon receiving operation information from the input device 6, the information processing device 10 reflects the operation information in the processing of system software or game software process, and causes an output device 4 to output the result of processing. In the information processing system 1, the information processing device 10 may be a game device (game console) that executes a game, and the input device 6 may be a device such as a game controller that supplies user operation information to the information processing device 10. It is to be noted that the input device 6 may be an input interface such as a keyboard or a mouse.

An auxiliary storage device 2 is a large capacity recording device such as a hard disk drive (HDD) or a solid state drive (SSD). The auxiliary storage device 2 may be a built-in recording device, or may be an external recording device to be connected to the information processing device 10 via a universal serial bus (USB) or the like. The output device 4 may be a television set that includes a display for outputting images and a loudspeaker for outputting sounds. The output device 4 may be connected to the information processing device 10 via a cable, or may be wirelessly connected to the information processing device 10.

A camera 7 which is an imaging device is disposed around the output device 4, and captures an image of a space surrounding the output device 4. In FIG. 1, the camera 7 is mounted on the upper portion of the output device 4. However, the camera 7 may be mounted on a side portion or a lower portion of the output device 4. In either case, the camera 7 is disposed at a position where the camera 7 can capture an image of the user who is positioned in front of the output device 4. The camera 7 may be a stereo camera.

The server device 5 provides a network service to the users of the information processing system 1. The server device 5 manages network accounts (user accounts) for identifying respective users. Each user uses a network account to sign in to the network service provided by the server device 5. By signing in to the network service through the information processing device 10, the user can register, in the server device 5, save data regarding a game or a trophy which is a virtual prize obtained during game play. Since save data and a trophy are registered in the server device 5, the save data and trophies can be synchronized between devices even in a case where the user uses an information processing device different from the information processing device 10.

The server device 5 according to the embodiment collects pieces of event data from a plurality of the information processing devices 10 operated by a plurality of players. The server device 5 uses the collected pieces of event data to statistically process playing time for an activity and evaluates, for each activity, playing time corresponding to a player skill value, which represents the skill of the user in the game play. In addition, the server device 5 derives the player skill value of each user from the collected pieces of event data. On the basis of the playing time for an activity corresponding to the player skill value and the player skill value of the user, the server device 5 can report, to a user who has not performed the activity, the playing time corresponding to the player skill value of the user, as estimated playing time. Upon being notified of the estimated playing time, the user can determine whether or not to play the activity according to the user's situation (for example, the user has to leave home in an hour later, or other cases).

Figure 2:
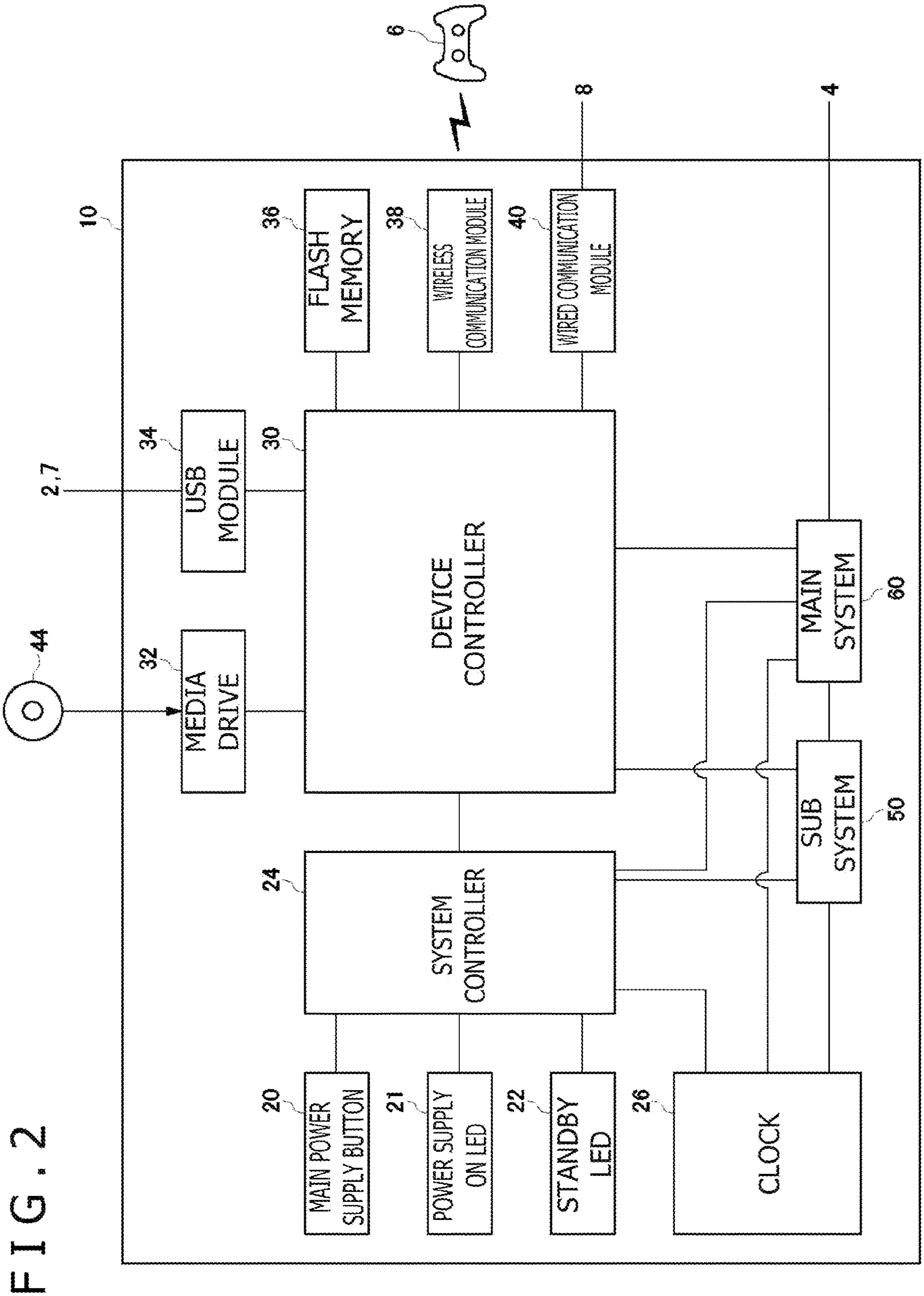
FIG. 2 is a diagram depicting a hardware configuration of the information processing device.

FIG. 2 depicts a hardware configuration of the information processing device 10. The information processing device 10 includes a main power supply button 20, a power supply on light emitting diode (LED) 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 includes a main central processing unit (CPU), a memory as a main storage and a memory controller, a graphics processing unit (GPU), and the like. The GPU is mainly used for computation processing of a game program. The main CPU has a function of activating system software and executing a game program installed in the auxiliary storage device 2 under an environment provided by the system software. The sub system 50 includes a sub CPU, a memory as a main storage device and a memory controller, and the like, but does not include a GPU.

The main CPU has a function of executing the game program installed in the auxiliary storage device 2 while the sub CPU does not have such a function. The sub CPU has a function of making access to the auxiliary storage device 2, and a function of exchanging data with the server device 5. Since the sub CPU is configured to have these limited processing functions, the sub CPU can operate with lower power consumption than the main CPU. The functions of the sub CPU are executed when the main CPU is in a standby state.

The main power supply button 20 is an input unit to which a user operation is input. The main power supply button 20 is disposed on a front surface of a casing of the information processing device 10, and is operated to turn on/off power supply to the main system 60 of the information processing device 10. The power supply on LED 21 is lit when the main power supply button 20 is on. The standby LED 22 is lit when the main power supply button 20 is off. The system controller 24 detects that a user presses down the main power supply button 20.

The clock 26 is a real time clock. The clock 26 generates current date and time information, and supplies the information to the system controller 24, the sub system 50, and the main system 60.

The device controller 30 is configured as a large-scale integrated circuit (LSI) that executes information exchange between devices as a south bridge. Devices including a system controller 24, a media drive 32, a USB module 34, a flash memory 36, a wireless communication module 38, a wired communication module 40, a sub system 50, and a main system 60 are connected to the device controller 30, as depicted in the drawing. The device controller 30 absorbs the difference in electric characteristic or data transfer speed among the devices, and controls a timing of data transfer.

The media drive 32 is a drive device that is driven with a read only memory (ROM) medium 44 mounted thereto, the ROM medium 44 recording application software such as a game and license information, and reads out a program and data from the ROM medium 44. The ROM medium 44 is a read-only recording medium such as an optical disk, a magneto-optical disk, or a Blu-ray disk.

The USB module 34 is a module connected to an external device via a USB cable. The USB module 34 may be connected to the auxiliary storage device 2 and the camera 7 via a USB cable. The flash memory 36 is an auxiliary storage device constituting an inner storage. The wireless communication module 38 performs wireless communication with the input device 6 by using a communication protocol such as a Bluetooth (registered trademark) protocol or an Institute of Electrical and Electronics Engineers (IEEE) 802.11 protocol. The wired communication module 40 performs wired communication with an external device, and is connected to the network 3 via the AP 8.

Figure 3:
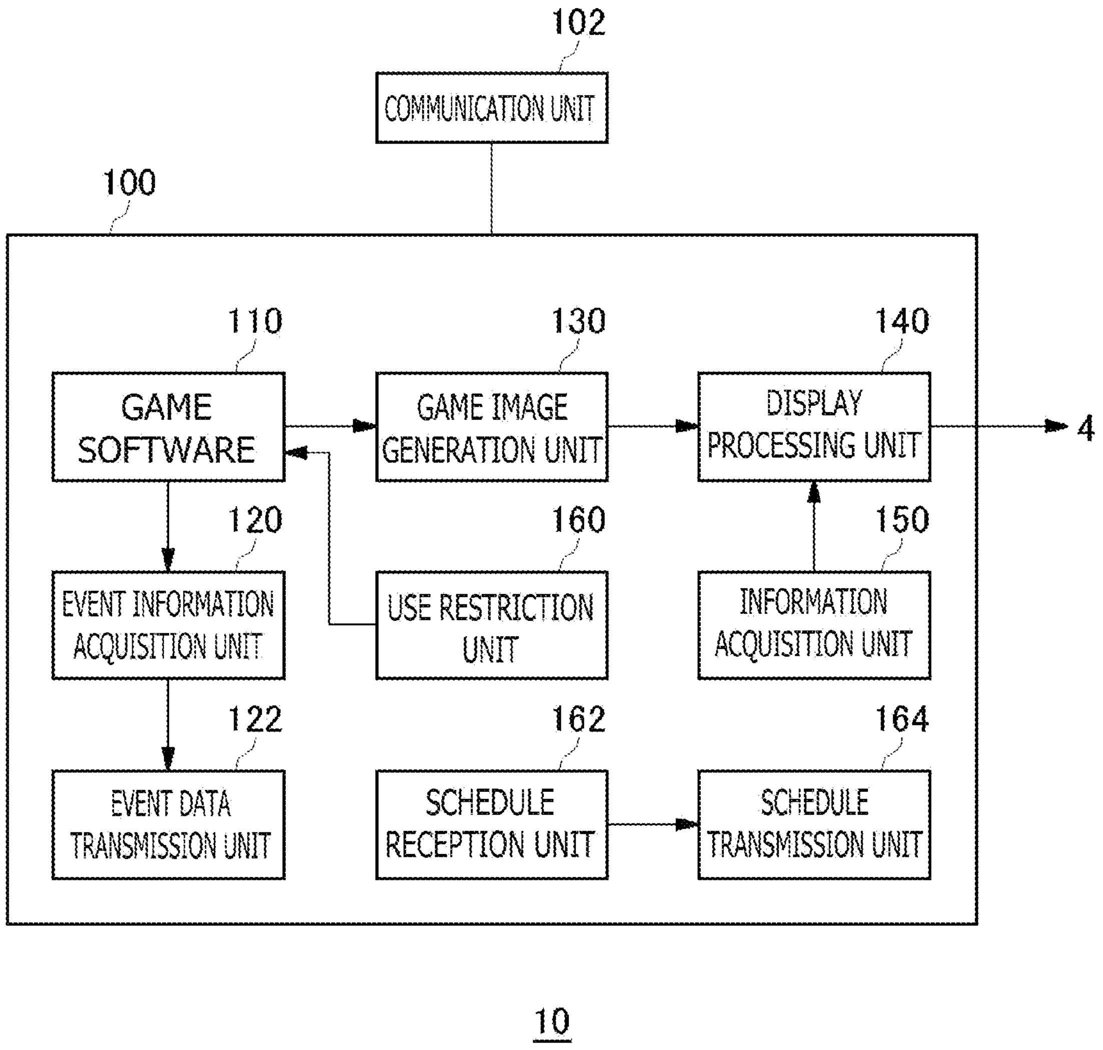
FIG. 3 is a diagram depicting functional blocks of the information processing device.

FIG. 3 depicts functional blocks of the information processing device 10. The information processing device 10 includes a processing unit 100 and a communication unit 102. The processing unit 100 includes game software 110, an event information acquisition unit 120, an event data transmission unit 122, a game image generation unit 130, a display processing unit 140, an information acquisition unit 150, a use restriction unit 160, a schedule reception unit 162, and a schedule transmission unit 164.

The information processing device 10 includes a computer. When the computer executes a program, various functions depicted in FIG. 3 are implemented. The computer includes, as hardware, a memory into which a program is loaded, one or more processors executing a loaded program, an auxiliary storage device, and other LSIs. The processor is formed of a plurality of electronic circuits including semiconductor integrated circuits and LSIs. The plurality of electronic circuits may be mounted on one chip, or may be mounted on a plurality of chips. The functional blocks in FIG. 3 are implemented by cooperation between hardware and software. Therefore, a person skilled in the art will understand that these functional blocks can be implemented in many different forms by hardware only, software only, or a combination thereof.

The game software 110 includes at least a game program, image data, and sound data. The game program receives information regarding an operation of the input device 6 performed by the user, and performs computation processing of moving a game character in a virtual space. The game image generation unit 130 includes a GPU that executes rendering, etc., to generate game image data. The display processing unit 140 outputs the generated game image from the output device 4. It is to be noted that the processing unit 100 includes a game sound generating unit that generates game sound data and a sound outputting unit that outputs a game sound, which are not depicted in FIG. 3.

When an activity is started during the progress of the game, the game program outputs event information that indicates occurrence of a start event of the activity. After the activity is ended, the game program outputs event information that indicates occurrence of an end event of the activity. Upon acquiring event information from the game software 110, the event information acquisition unit 120 generates event data by adding the user account, the game ID, and time information (time stamp) regarding the time of occurrence of an event to the event information and provides the event data to the event data transmission unit 122. It is to be noted that the game program may output event information that includes the game ID and/or the time stamp to the event information acquisition unit 120. The event data transmission unit 122 transmits the generated event data to the server device 5 via the communication unit 102.

A game developer may prepare a variety of activities in a game. For example, in a case where a battle activity involving an enemy boss is incorporated in a game, the game program outputs event information that includes an activity ID for identifying the battle activity and information indicating a start of the battle activity when the battle is started. When the player wins in the battle with the enemy boss, the game program outputs event information that includes an activity ID for identifying the battle activity, information indicating the end of the battle activity, and information indicating the success in the activity.

The event data transmission unit 122 transmits event data regarding the activity performed by the player, to the server device 5 via the communication unit 102. In the information processing system 1, the process of transmitting event data is performed by all of the information processing devices 10 that are connected to the server device 5, and the server device 5 collects pieces of event data regarding various kinds of activities included in various kinds of games from the plurality of the information processing devices 10. It is preferable that, upon acquiring event information from the game software 110, the event information acquisition unit 120 immediately generate event data to which a time stamp is added, and that the event data transmission unit 122 transmit the event data to the server device 5.

For a user who is a child, a parent of the user can set a time period (allowable playing time period) during which the user is allowed to play a game a day, by using a parental control function. In a case where an allowable playing time period is set for the user, the use restriction unit 160 measures a playing time period of the user. When the playing time period measured for a day reaches the allowable playing time period, the use restriction unit 160 imposes restriction on use of the information processing device 10. The use restriction unit 160 may impose restriction on the function for performing the game without imposing restriction on the functions other than the function for performing the game. When remaining playing time reaches a predetermined time (e.g., five minutes), the display processing unit 140 may display information regarding the remaining time on the output device 4.

Figure 4:
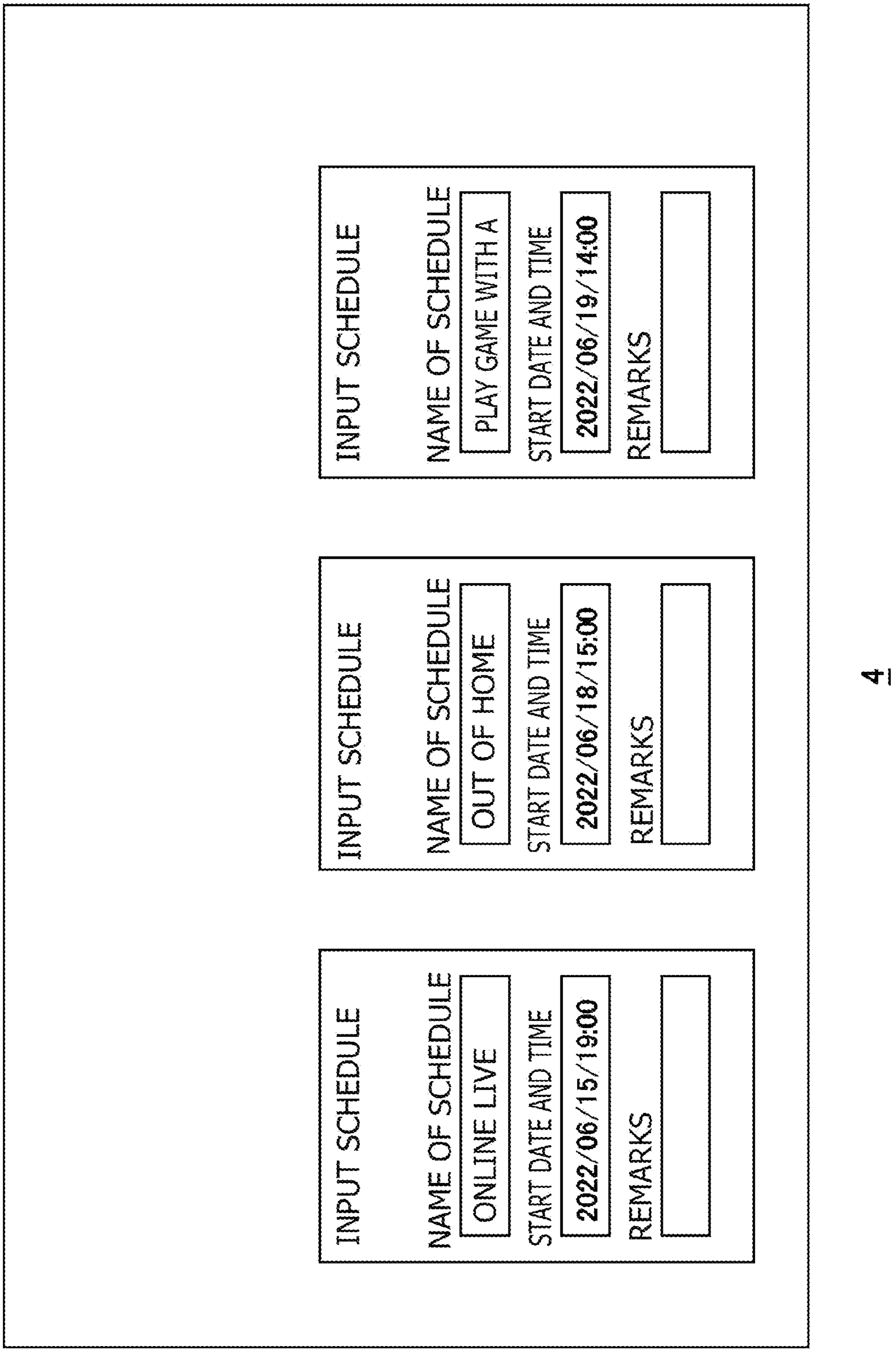
FIG. 4 is a diagram depicting an example of a schedule input screen.

The schedule reception unit 162 receives a schedule of an online live event or the like from a user. Information to be received by the schedule reception unit 162 includes at least information for identifying date and time. FIG. 4 depicts an example of a schedule input screen. By operating the input device 6, the user can input a schedule to the schedule input screen displayed on the output device 4. The schedule input screen includes items for "name of schedule," "start date and time," and "remarks." The user may be required to fill at least "name of schedule" and "start date and time." The schedule reception unit 162 receives the input schedule. As depicted in FIG. 4, the user may input a variety of plans including an online live, a plan for going out, a plan for playing a game with a friend, etc.

The schedule transmission unit 164 transmits information regarding a time at which the user will end the game play to the server device 5 via the communication unit 102. Specifically, the schedule transmission unit 164 transmits the schedule (including scheduled start date and time) received by the schedule reception unit 162, to the server device 5 via the communication unit 102. The display processing unit 140 may display information indicating that a predetermined time is left before the scheduled start time on the output device 4, when the predetermined time (five minutes) is left before the scheduled start time, for example.

Figure 5:
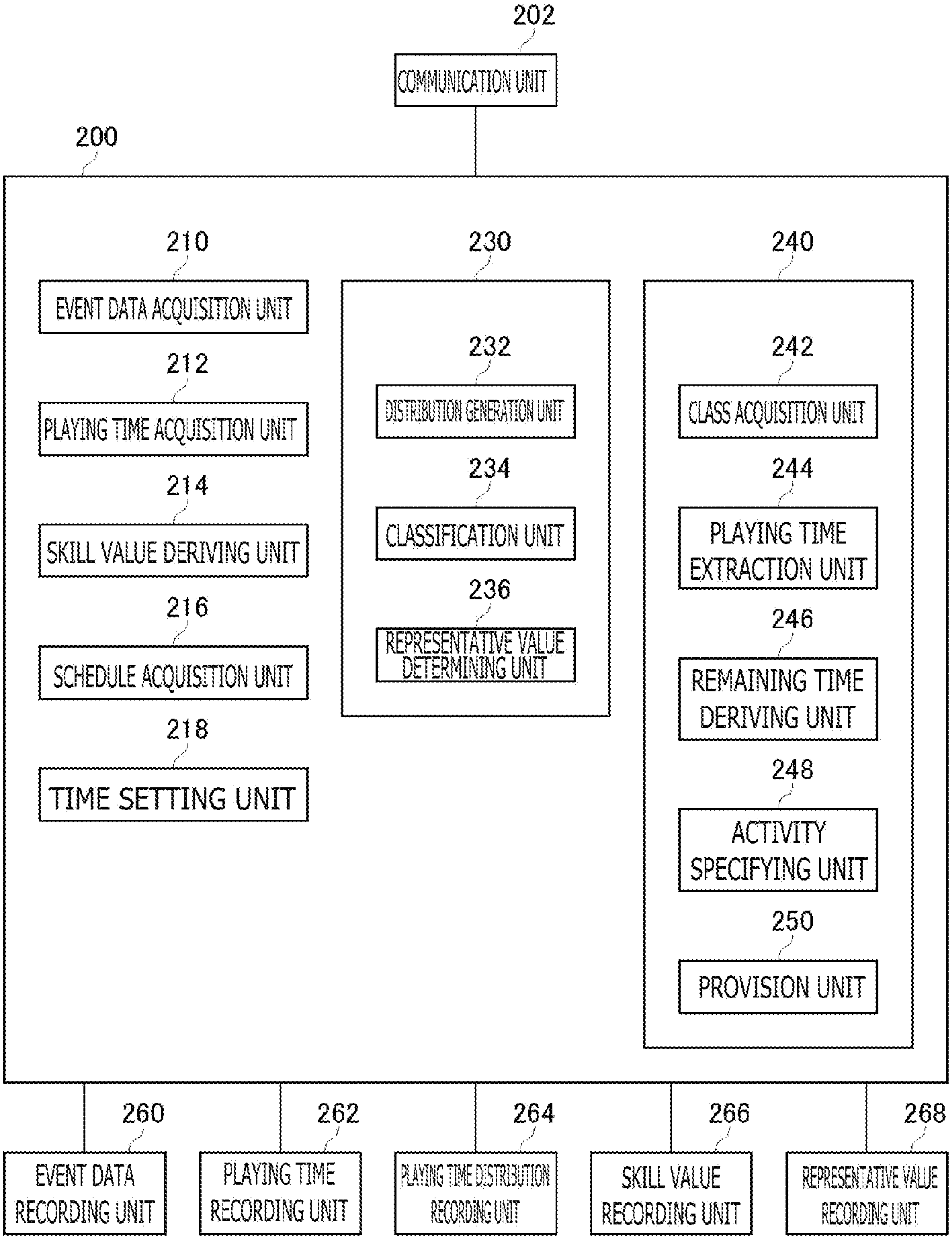
FIG. 5 is a diagram depicting functional blocks of a server device.

FIG. 5 depicts functional blocks of the server device 5 according to the embodiment. The server device 5 includes a processing unit 200, a communication unit 202, an event data recording unit 260, a playing time recording unit 262, a playing time distribution recording unit 264, a skill value recording unit 266, and a representative value recording unit 268. The processing unit 200 includes an event data acquisition unit 210, a playing time acquisition unit 212, a skill value deriving unit 214, a schedule acquisition unit 216, a time setting unit 218, a statistical processing unit 230, and an information provision unit 240. The statistical processing unit 230 includes a distribution generation unit 232, a classification unit 234, and a representative value determining unit 236. The information provision unit 240 includes a class acquisition unit 242, a playing time extraction unit 244, a remaining time deriving unit 246, an activity specifying unit 248, and a provision unit 250.

The server device 5 includes a computer. When the computer executes a program, various functions depicted in FIG. 5 are implemented. The computer has hardware including a memory into which a program is loaded, one or more processors that execute a loaded program, an auxiliary storage device, and other LSIs. The processor is formed of a plurality of electronic circuits including semiconductor integrated circuits and LSIs. The plurality of electronic circuits may be mounted on one chip, or may be mounted on a plurality of chips. The functional blocks in FIG. 5 are implemented by cooperation between hardware and software. Therefore, a person skilled in the art will understand that these functional blocks can be implemented in many different forms by hardware only, software only, or a combination thereof.

The event data acquisition unit 210 acquires, from the plurality of the information processing devices 10, pieces of event data regarding an activity performed by a plurality of players and records the pieces of event data in the event data recording unit 260. The event data recording unit 260 records the pieces of event data for each game title in association with the player's network account. As described above, the event data includes at least the game ID, the activity ID, information indicating the start or end of the activity, and a time stamp. Hereinafter, a procedure of analyzing the collected pieces of event data by the server device 5 will be described.

Figure 6:
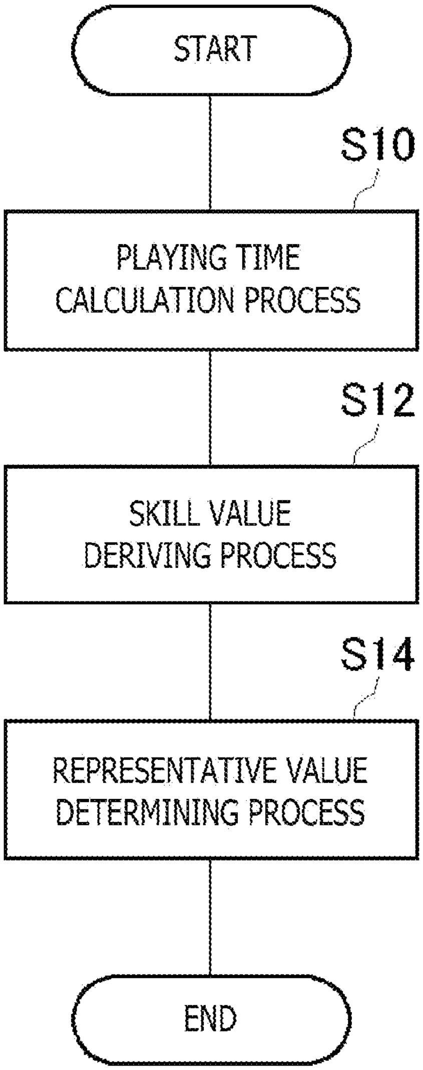
FIG. 6 is a diagram depicting a procedure of analyzing collected pieces of event data.

FIG. 6 depicts a procedure of analyzing collected pieces of event data. The analysis of the collected pieces of event data includes a playing time calculation process (S10) which is executed by the playing time acquisition unit 212, a skill value deriving process (S12) which is executed by the skill value deriving unit 214, and a representative value determining process (S14) which is executed by the representative value determining unit 236.

<S10: Playing Time Calculation Process>

The playing time acquisition unit 212 acquires playing time for an activity. The playing time acquisition unit 212 acquires, from pieces of event data (start event data) including activity start event information and event data (end event data) including activity end event information which are recorded in the event data recording unit 260, the playing time periods of a plurality of players for the activity. The playing time for an activity is calculated on the basis of the time stamp included in the start event data and the time stamp included in the end event data.

Figure 7:
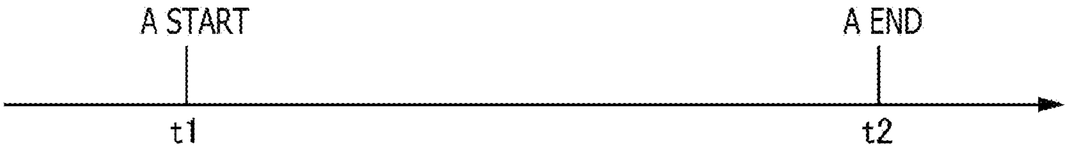
FIG. 7 is a diagram for describing a method used for calculating playing time.

FIG. 7 is a diagram for describing a method used for calculating playing time. In FIG. 7, a start event and an end event of an activity A played by one player are depicted. Specifically, "A START" and "A END" each indicate a start event of the activity A and an end event of the activity A, respectively. A start time t1 of the activity A is included in the start event data. An end time t2 of the activity A is included in the end event data. The playing time acquisition unit 212 calculates the player's playing time for the activity A to be (t2−t1). The playing time acquisition unit 212 records the calculated playing time for the activity together with the game ID and the activity ID in the playing time recording unit 262 in association with the network account of the player. The playing time acquisition unit 212 analyzes the pieces of event data of the plurality of players, acquires the playing time for each of the players for each of the activities, and records the acquired playing time periods in the playing time recording unit 262.

<S12: Skill Value Deriving Process>

In the statistical processing unit 230, the distribution generation unit 232 generates a distribution of playing time for each activity on the basis of the plurality of playing time periods acquired by the playing time acquisition unit 212. The distribution generation unit 232 records the generated distribution of playing time for each activity in the playing time distribution recording unit 264.

Figure 8A:
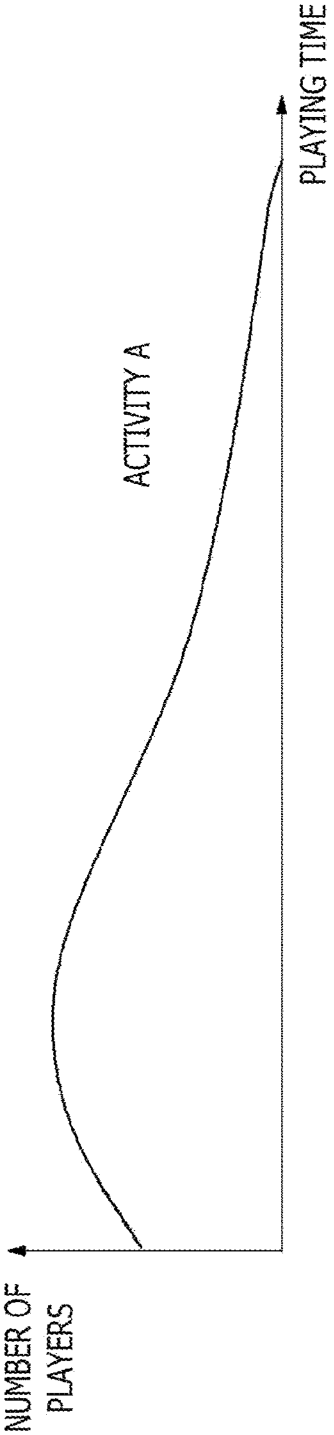
FIG. 8A and FIG. 8B are diagrams each depicting a distribution curve that represents a relation between the playing time for an activity and the number of players who have performed the activity.
Figure 8B:
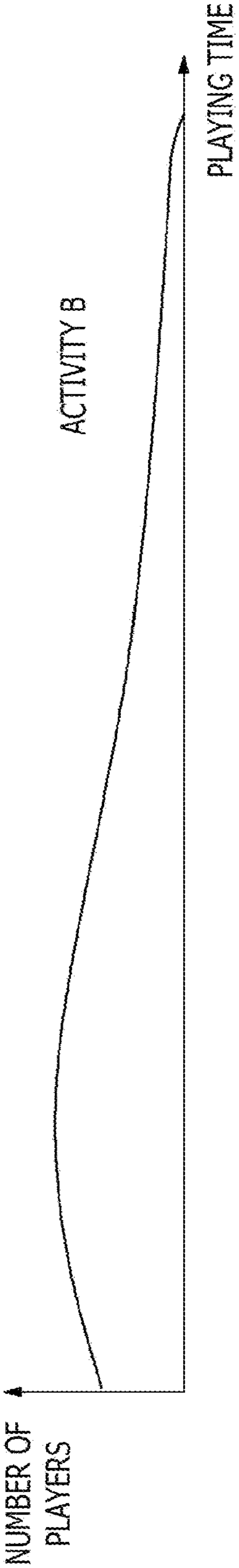

FIGS. 8A and 8B each indicate a distribution curve that represents a relation between playing time for one activity and the number of players having performed the activity. The horizontal axis indicates the playing time, while the vertical axis indicates the number of players. FIG. 8A indicates the relation between the playing time for the activity A and the number of players thereof. FIG. 8B indicates the relation between the playing time for the activity B and the number of players thereof.

Based on such a premise that there is a correspondence between playing time for an activity and user's skill in playing games, the server device 5 implements a technology for deriving a skill value obtained by evaluating the user's skill, and reporting playing time corresponding to the derived skill value to the user. According to this premise, a user having high game skill completes an activity in a relatively short period of playing time, while a user having low game skill completes an activity in a relatively long period of playing time. Accordingly, the user who has high game skill is predicted to complete both the activity A and the activity B in a shorter period of playing time, while the user who has low game skill is predicted to complete both the activity A and the activity B in a longer period of playing time.

Figure 9A:
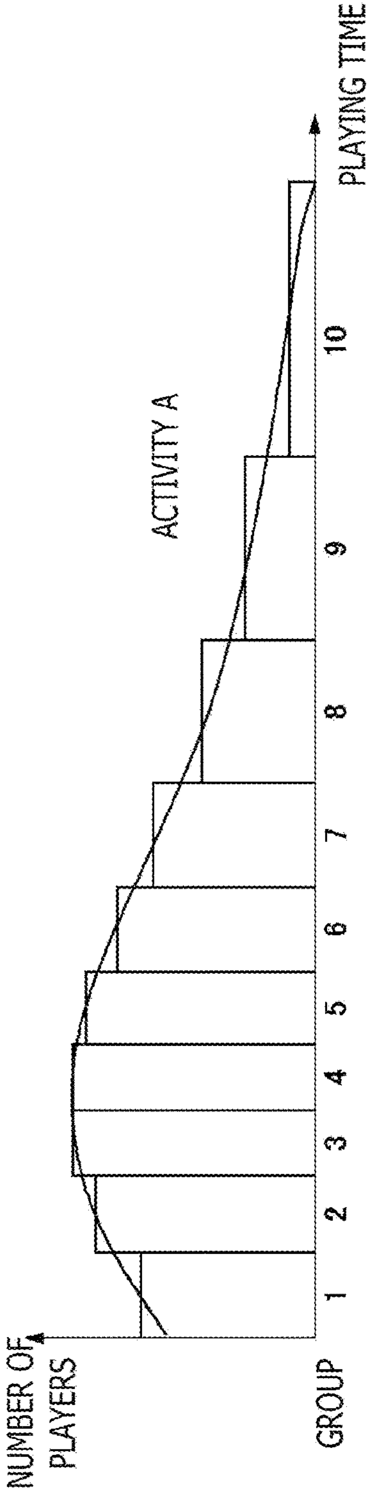
FIG. 9 is a diagram depicting a distribution of playing time.
Figure 9B:
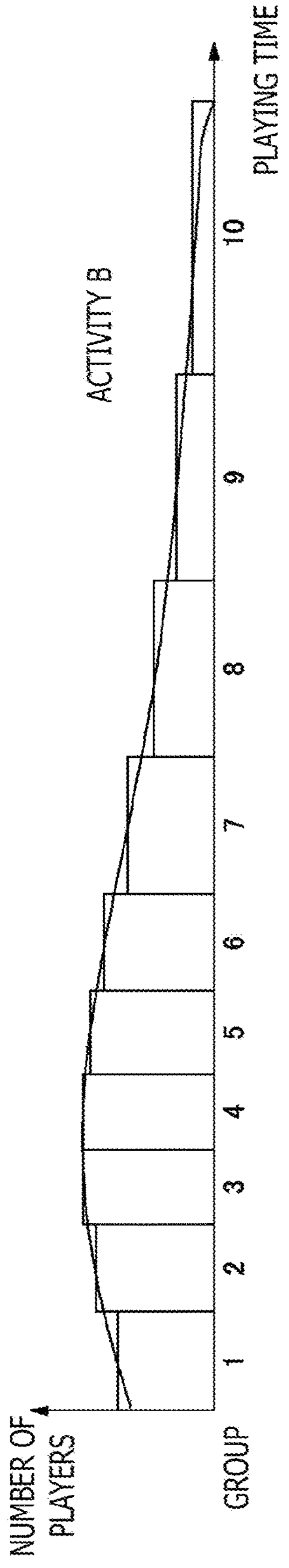

FIGS. 9A and 9B each depict a distribution of playing time. For each activity, the distribution generation unit 232 arranges all the players in the order of shorter period of playing time, and classifies all the players into a plurality of groups such that each of the groups includes the same number of players. In the embodiment, the distribution generation unit 232 classifies all the players into ten groups in total, for example, group 1 to group 10. Each group includes the same number of players. In a case where the number of players having played the activity A is one million, each group includes 100 thousand players. Group 1 is a group in which players having the shortest playing time are gathered, and group 10 is a group in which players having the longest playing time are gathered. The distribution generation unit 232 records the generated distribution of playing time for each activity in the playing time distribution recording unit 264. For example, the playing time distribution recording unit 264 may record, as the distribution of playing time, the group numbers ranging from 1 to 10, in association with the shortest period of playing time and the longest period of playing time included in each group.

The skill value deriving unit 214 derives the skill value of a user for the activity on the basis of the user's playing time for the activity and a distribution of playing time for the activity. The skill value deriving unit 214 derives a user's skill value for the activity by referring to the distribution of playing time recorded in the playing time distribution recording unit 264 and specifying the group number of a group that includes the user's playing time. In the embodiment, a group number may directly represent a skill value. Therefore, in a case where the playing time of the user who has performed the activity A is included in the group with the group number 3, the skill value deriving unit 214 derives "3" as the user skill value for the activity A. In a case where the playing time of the user who has performed the activity B is included in the group with the group number 5, the skill value deriving unit 214 derives "5" as the user skill value for the activity B. In the embodiment, the skill value 1 represents the highest skill level, while the skill value 10 represents the lowest skill level. The skill value deriving unit 214 records the skill values derived for all the activities that the user has played in the skill value recording unit 266, in association with the network account of the user (player).

The skill value deriving unit 214 derives the user's skill value concerning game play on the basis of the plurality of skill values derived for a plurality of activities. Specifically, the skill value deriving unit 214 derives the user's skill values for the plurality of activities most recently played by the user, and then, derives the user's skill value concerning the game play by averaging the derived skill values. In the embodiment, the skill value deriving unit 214 derives the user's skill value concerning the game play by averaging ten skill values derived for the most recently played ten activities. Hereinafter, the user's skill value concerning the game play is referred to as a "player skill value" in some cases.

A specific example of deriving the player skill value of a user X will be given below.

The group numbers of the groups including the playing time periods for the ten activities that the user X has most recently played are as follows:

Activity A: Group number 3
Activity B: Group number 5
Activity C: Group number 4
Activity D: Group number 2
Activity E: Group number 4
Activity F: Group number 5
Activity G: Group number 5
Activity H: Group number 5
Activity I: Group number 5
Activity J: Group number 6

Skill values are represented by the group numbers. Thus, the user's skill values for activities are derived as follows:

Activity A: Skill value 3
Activity B: Skill value 5
Activity C: Skill value 4
Activity D: Skill value 2
Activity E: Skill value 4
Activity F: Skill value 5
Activity G: Skill value 5
Activity H: Skill value 5
Activity I: Skill value 5
Activity J: Skill value 6

The skill value deriving unit 214 derives the player skill value of the user X by averaging the skill values derived for the ten activities.

$$(\text{Player skill value})=(3+5+4+2+4+5+5+5+5+6)/10=4.4$$

In this manner, the skill values derived for the most recently performed ten activities are averaged, and the player skill value of the user X is derived to be "4.4."

The skill value deriving unit 214 derives the player skill values of all the users and records the player skill values in the skill value recording unit 266. The player skill value takes a value in a range of 1 to 10. A user having a smaller player skill value has a higher game skill, while a user having a greater player skill value has a lower game skill.

The skill value deriving unit 214 derives a player skill value on the basis of skill values derived for a predetermined number of most recently performed activities, as described above. The skill value deriving unit 214 may update the player skill value of the user every time the user performs an activity. Alternatively, the skill value deriving unit 214 may update the player skill value regularly, or once a day, for example.

<S14: Representative Value Determining Process>

In the statistical processing unit 230, the classification unit 234 sets a plurality of classes and classifies a player into any one of the classes according to the player skill value of the player.

In the embodiment, the classification unit 234 sets nine classes and classifies the users in accordance with the following rule. PS represents the player skill value.

$1 \le PS \le 2$: Class 1
$2 \le PS \le 3$: Class 2
$3 \le PS \le 4$: Class 3
$4 \le PS \le 5$: Class 4
$5 \le PS \le 6$: Class 5
$6 \le PS \le 7$: Class 6
$7 \le PS \le 8$: Class 7
$8 \le PS \le 9$: Class 8
$9 \le PS \le 10$: Class 9

The user X who has the player skill value of "4.4" is classified into class 4 by the classification unit 234. The classification unit 234 classifies all the users joining the information processing system 1 into classes 1 to 9 according to the player skill values and records the classes of the users into the skill value recording unit 266.

Figure 10:
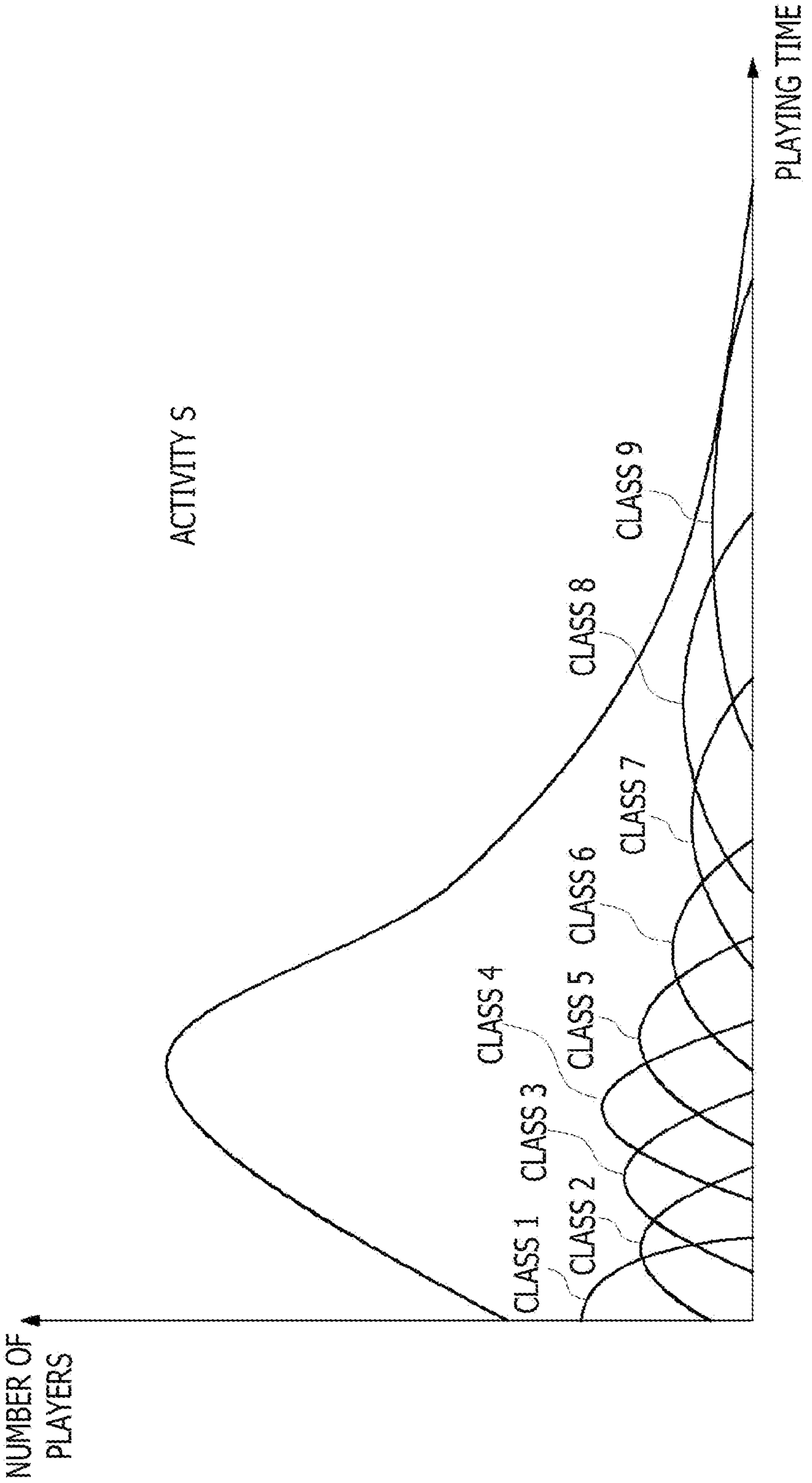
FIG. 10 is a diagram depicting a graph in which players of each class are plotted.

FIG. 10 is a graph in which the players of each class are plotted in a distribution curve that represents the relation between the playing time for an activity S and the number of players thereof. The graph of class 1 represents the relation between the playing time periods of the players belonging to class 1 and the number of the players thereof.

The graph of the class 2 represents the relation between the playing time periods of the players belonging to class 2 and the number of the players thereof. That is, the graph of class N (1 to 9) represents the relation between the playing time periods of the players belonging to class N and the number of the players thereof. Accordingly, when the graphs of all the classes 1 to 9 are added up, a distribution curve that represents the relation between the playing time periods of all the users for the activity S and the number of players thereof is obtained. It is to be noted that the classes may be different in the numbers of players.

The representative value determining unit 236 determines a representative value of the playing time in each class, for each activity, on the basis of the playing time periods of the plurality of players in each class. The representative value determining unit 236 may derive, as a representative value of each class, a median value of the plurality of playing time periods in each class. The representative value determining unit 236 determines the representative value (medN) of the playing time in each class as follows.

Class 1: med1
Class 2: med2
Class 3: med3
Class 4: med4
Class 5: med5
Class 6: med6
Class 7: med7
Class 8: med8
Class 9: med9

The representative value of the playing time determined for each class may be provided, as the estimated playing time, to the user who has not performed the activity S. In a case where the user X belonging to class 4 has not performed the activity S, the server device 5 can report, to the user X, that the estimated playing time of the user X for the activity S is "med4."

Regarding each of the activities, the representative value determining unit 236 determines respective representative values for classes 1 to 9, and records the representative values in association with the classes in the representative value recording unit 268. In the embodiment, a representative value is a median value. However, an average value or a mode value may be used, alternatively. The representative value determining unit 236 may perform the representative value determining process regularly or once a day, for example. The analysis process for the event data according to the embodiment has been described so far.

The information provision unit 240 reports, to a user who is operating the information processing device 10, the estimated playing time for the activity which the user has not performed. Specifically, the information provision unit 240 reports, to the user, the representative value of the playing time associated with the class of the user or the time period based on the representative value, as the estimated playing time. The information provision unit 240 may report the estimated playing time at any desired timing.

The class acquisition unit 242 acquires, from the skill value recording unit 266, the class to which the user operating the information processing device 10 belongs. For example, when the user X logs in to the information processing device 10, the class acquisition unit 242 may acquire, from the skill value recording unit 266, the class to which the user X who has performed the login belongs. Regarding the activity that can be performed by the user X, the playing time extraction unit 244 extracts the representative value of the playing time associated with the class of the user X from the representative value recording unit 268.

The provision unit 250 reports information regarding the estimated playing time based on the extracted representative value of the playing time, to the information processing device 10 of the user X. It is to be noted that the estimated playing time based on the representative value of the playing time may be a representative value of the playing time itself, or may alternatively be a time period obtained by slightly adjusting the representative value of the playing time. For example, in a case where the representative value of the playing time is 4.9 minutes, the provision unit 250 may use a nice round number (e.g., five minutes) as the estimated playing time. The provision unit 250 may report information regarding the estimated playing time of each of a plurality of activities to the information processing device 10 of the user X.

In the information processing device 10, the information acquisition unit 150 acquires information regarding the estimated playing time for an activity from the server device 5. The display processing unit 140 displays the information acquired by the information acquisition unit 150.

Figure 11:
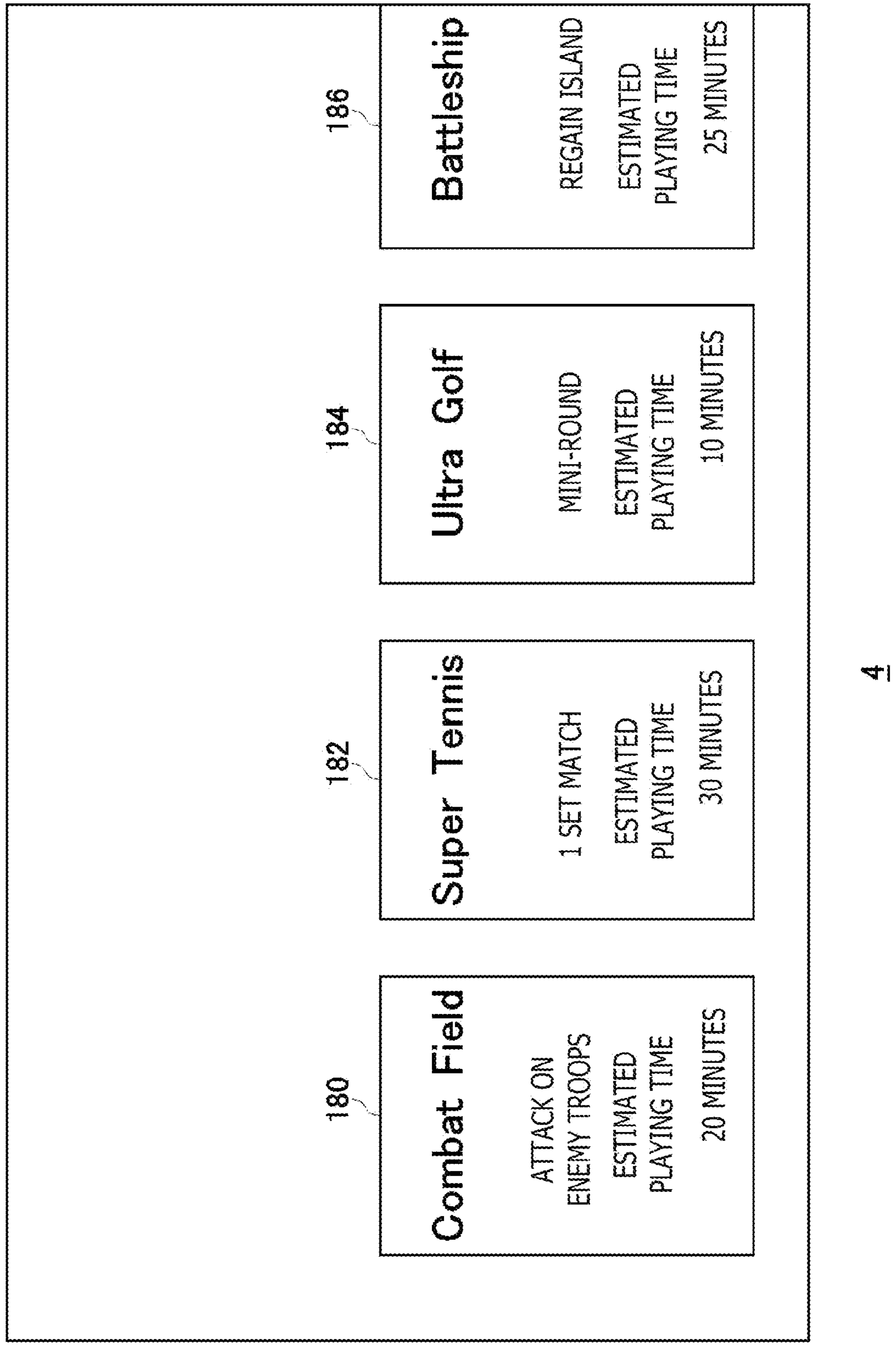
FIG. 11 is a diagram depicting an example of a system screen.

FIG. 11 depicts an example of a system screen that is displayed on the output device 4.

The display processing unit 140 generates system images 180, 182, 184, and 186 from the information acquired by the information acquisition unit 150, and displays the system images on the output device 4. These four system images 180, 182, 184, and 186 each indicate the estimated playing time for an activity in a different game title. Accordingly, on the basis of the estimated playing time for each activity, the user X can determine which game to play.

In the example in FIG. 11, the following activities in the game titles are indicated together with each corresponding estimated playing time.

Title "Combat Field," Activity name "Attack on Enemy troops"
Estimated playing time: 20 minutes
Title "Super Tennis," Activity name "1 Set Match"
Estimated playing time: 30 minutes
Title "Ultra Golf," Activity name "Mini-round"
Estimated playing time: 10 minutes
Title "Battleship," Activity name "Regain Island"
Estimated playing time: 25 minutes The system images 180, 182, 184, and 186 which are displayed in card forms may be a graphical user interface (GUI). For example, when the user X selects any one of the system images, a game corresponding to the system image may automatically be started.

<Activity Providing Process with Time Limit Imposed>

The estimated playing time of each of the activities is displayed on the system images in FIG. 11. Estimated playing time is the median value of past playing time periods for the class to which the user X belongs. Therefore, when the user plays the activity, the actual playing time may possibly become greater than the estimated playing time (in theory, the probability that the actual playing time becomes greater than the estimated playing time is approximately 50%). Accordingly, in a case where the user X who has a plan for joining a live event that will be started 30 minutes later plays the activity "1 Set Match" in the title "Super Tennis," the probability that the user X will not clear the activity in 30 minutes is 50%.

Therefore, the server device 5 according to the embodiment has a function of providing an activity that is highly likely to be completed by a user by a game play end time in a case where the game play end time is set for the user.

As described above, the information processing device 10 transmits the schedule input by the user to the server device 5. In the server device 5, the schedule acquisition unit 216 acquires the user's schedule, and the time setting unit 218 sets a game play end time of the user on the scheduled date according to the schedule. The time setting unit 218 may set the scheduled start time as a game play end time. In a case where the schedule acquisition unit 216 acquires the schedule input through the schedule input screen depicted in FIG. 4, the time setting unit 218 sets the end dates and times of the game play as follows:

Scheduled date: Jun. 15, 2022
Game play end time: 19:00
Scheduled date: Jun. 18, 2022
Game play end time: 15:00
Scheduled date: Jun. 19, 2022
Game play end time: 14:00

Figure 12:
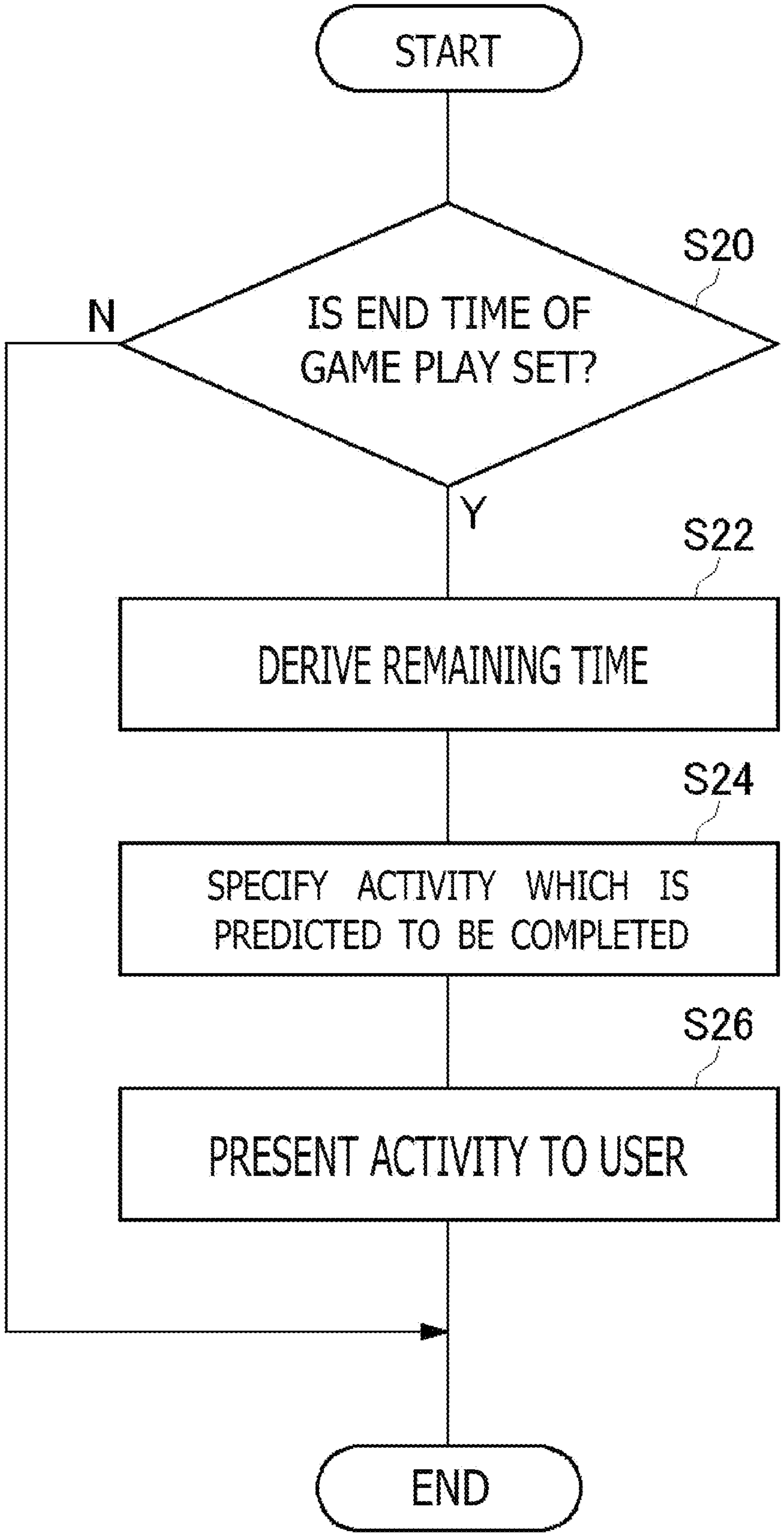
FIG. 12 is a flowchart depicting a process of presenting information regarding an activity.

FIG. 12 is a flowchart depicting a process of presenting information regarding an activity. A process performed when the information provision unit 240 presents, to the user X, information regarding an activity that the user X has not performed and the current date and time is 18:30 on Jun. 15, 2022, will be described below.

The remaining time deriving unit 246 checks whether or not a game play end time is set for the user X on the day (Jun. 15, 2022) (S20). When the game play end time has not been set on the day (N at S20), the information provision unit 240 ends the present flow. In this case, the information provision unit 240 may provide information regarding the estimated playing time to the information processing device 10 in order to display the system screen, which is indicated in FIG. 11, on the information processing device 10.

When the game play end time (19:00) has been set to the user X on the day (Y at S20), the remaining time deriving unit 246 derives remaining time left until the user X will end the game play (S22). In the present example, the remaining time deriving unit 246 derives that the time period from the current time (18:30) to the game play end time (19:00) is "30 minutes."

The activity specifying unit 248 specifies an activity that is predicted to be completed by the user X in the derived remaining time (30 minutes) (S24). It is preferable that the activity specifying unit 248 specify an activity that is predicted to be completed by the user X on the basis of the estimated playing time. The provision unit 250 provides information regarding the activity specified by the activity specifying unit 248, to the information processing device 10 of the user X (S26).

(Case 1)

The activity specifying unit 248 may specify, as an activity that is predicted to be completed by the user X in the remaining time, an activity for which the estimated playing time of the user X is shorter than the remaining time. In a case where the estimated playing time in FIG. 11 is specified, the activity specifying unit 248 specifies each activity for which the estimated playing time is shorter than the remaining time (30 minutes), as follows:

Title "Combat Field," Activity name "Attack on Enemy troops"
Estimated playing time: 20 minutes
Title "Ultra Golf," Activity name "Mini-round"
Estimated playing time: 10 minutes
Title "Battleship," Activity name "Regain Island"
Estimated playing time: 25 minutes The provision unit 250 provides information regarding each of the activities specified by the activity specifying unit 248, to the information processing device 10 of the user X.

Figure 13:
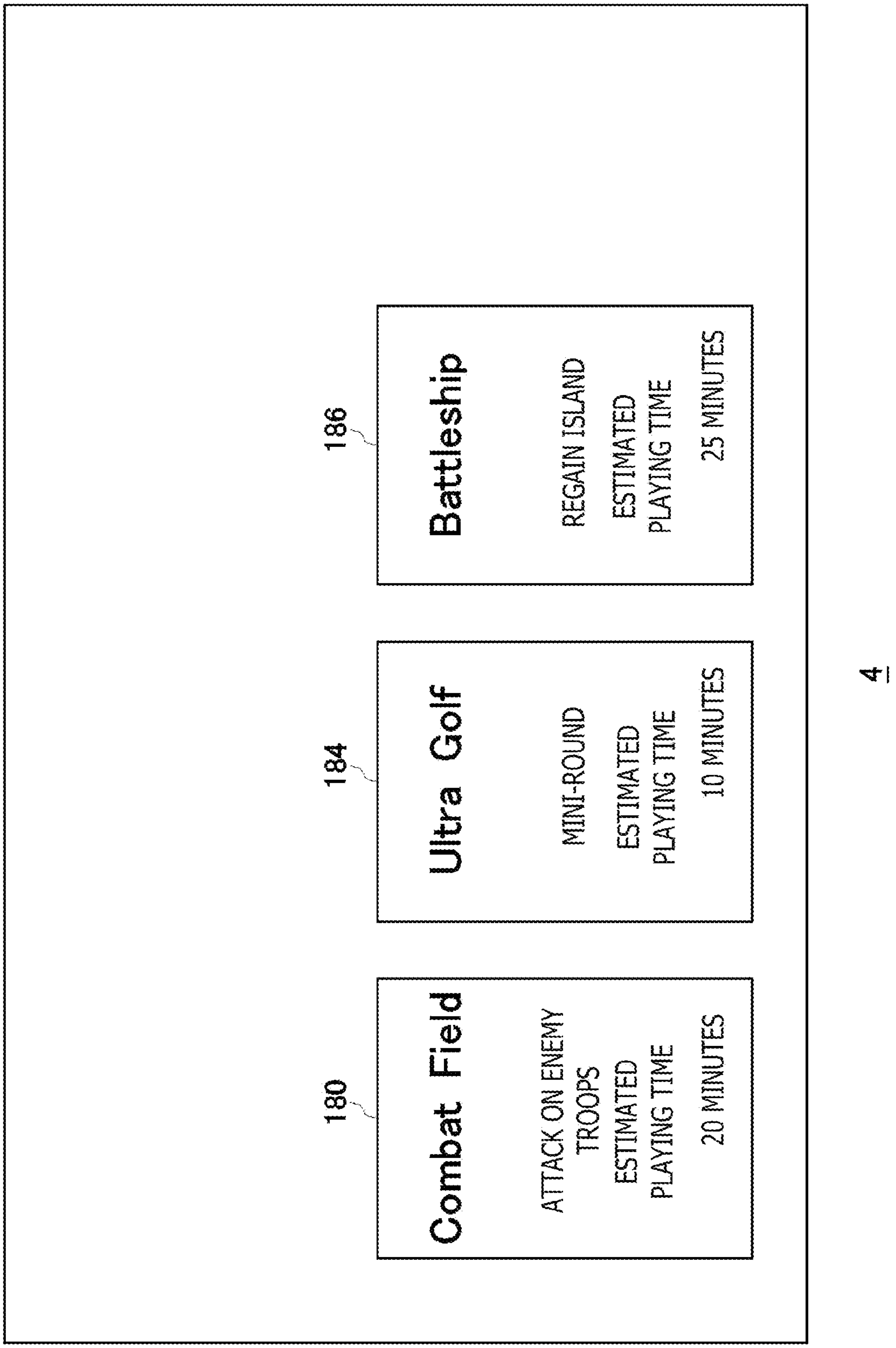
FIG. 13 is a diagram depicting an example of a system screen.

FIG. 13 depicts an example of a system screen which is displayed on the output device 4. The information acquisition unit 150 acquires information regarding the activity that is predicted to be completed by the user X by the end time. From the information acquired by the information acquisition unit 150, the display processing unit 140 generates the system images 180, 184, and 186 as information regarding each of the activities, and displays the system images 180, 184, and 186 on the output device 4. When the user X selects any one of the system images, a game corresponding to the selected system image is automatically started, so that the user X can play the activity of the relevant game.

Since options of activities for each of which the estimated playing time is shorter than the remaining time are presented to the user X, irrespective of which activity the user X plays, there is a high possibility that the user X can clear the activity by 19:00 at which the online live will start. Therefore, it is possible to reduce a possibility that the user X continues playing the activity after it has passed the start time of the online live.

It is to be noted that the display processing unit 140 may arrange a plurality of system images in the order of the shorter estimated playing time in an arrangement direction of the system images (from the left side to the right side of the screen in the present example). In the present example, the display processing unit 140 may arrange the system image 184, the system image 180, and the system image 186 in order from the left side. When the system image of an activity for which the estimated playing time is shorter is preferentially displayed from the left side of the screen, the user X is likely to select an activity that can reliably be completed within the remaining time.

It is to be noted that the display processing unit 140 may arrange the plurality of system images in the order of longer estimated playing time in the arrangement direction of the system images. In this example, the display processing unit 140 may arrange the system image 186, the system image 180, and the system image 184 in order from the left side. When the system image of an activity for which the estimated playing time is longer is preferentially displayed from the left side of the screen, the user X is likely to select an activity that can be played until just before the online live is started.

Figure 14:
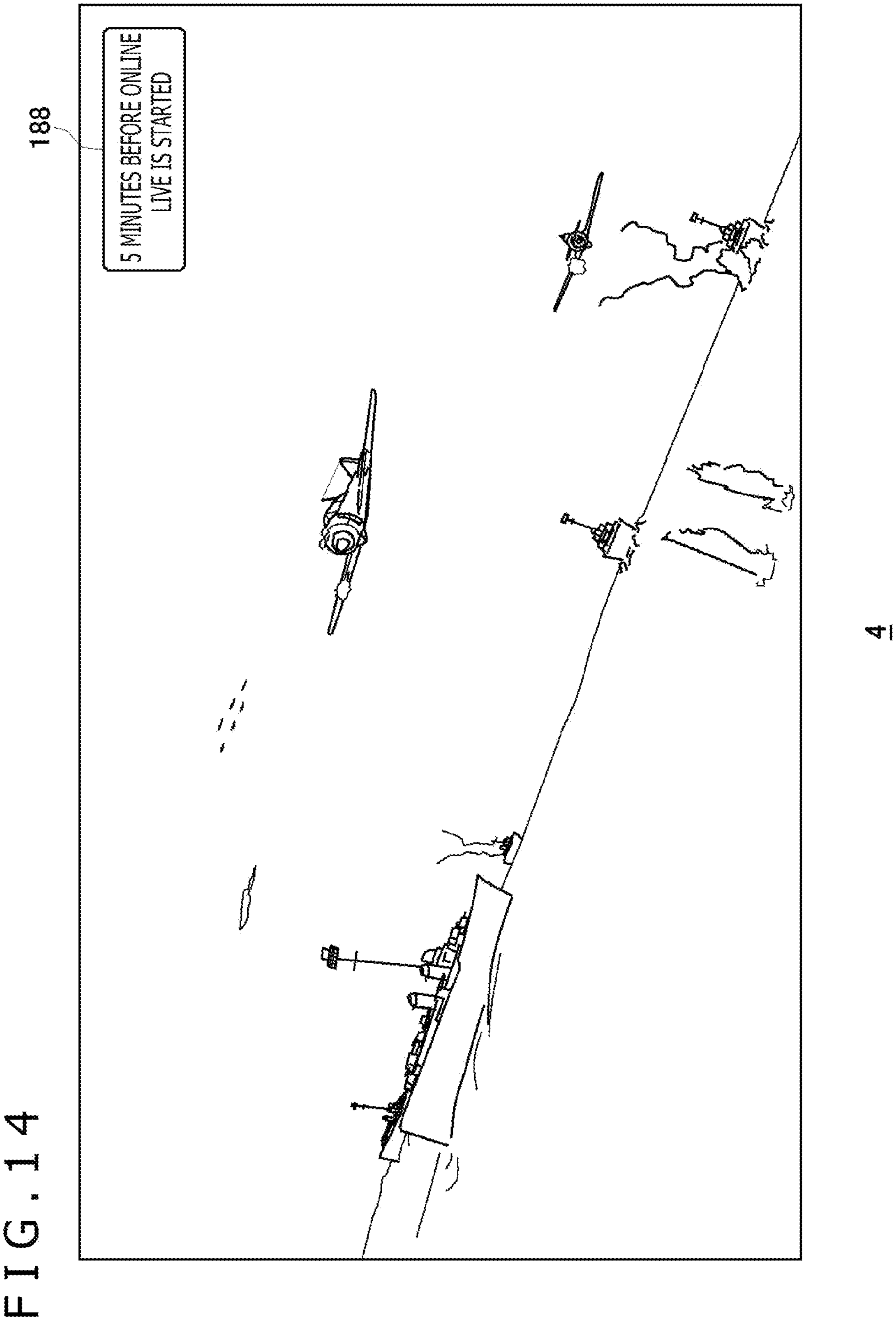
FIG. 14 is a diagram depicting an example of a game screen.

FIG. 14 depicts an example of a game screen which is displayed on the output device 4. In this example, the user X is playing an activity "Regain Island" in the game title "Battleship." A predetermined time (e.g., five minutes) before the start time of the online live, the display processing unit 140 may superimpose, on the game screen, report information 188 that indicates that the predetermined time is left before the start time.

(Case 2)

The activity specifying unit 248 may specify, as an activity that is predicted to be completed by the user X in the remaining time, an activity for which the estimated playing time of another user who has a lower game skill than the user X is equal to or shorter than the remaining time. In the embodiment, the classification unit 234 classifies the user X who has a player skill value of "4.4" into class 4. Thus, the activity specifying unit 248 specifies a class having a lower game skill than class 4 of the user X, and specifies an activity for which a representative value of playing time associated with the lower class, or estimated playing time based on the representative value is equal to or shorter than the remaining time. Specifically, when the activity specifying unit 248 specifies a class that is lower than class 4 by predetermined stages (e.g., class 6 which is lower than class 4 by two stages), the playing time extraction unit 244 extracts a representative value of playing time associated with class 6 for an activity that can be executed by the user X, from the representative value recording unit 268. On the basis of the extracted representative value of the playing time, the activity specifying unit 248 specifies an activity for which the estimated playing time associated with class 6 is equal to or shorter than the remaining time.

Regarding the following activities in the game titles, the playing time extraction unit 244 extracts estimated playing time for each of the activities associated with class 6, as follows:

Title: "Combat Field," Activity name: "Attack on Enemy troops"

Estimated playing time: 30 minutes for class 6

Title: "Super Tennis," Activity name: "1 Set Match"

Estimated playing time: 40 minutes for class 6

Title: "Ultra Golf," Activity name: "Mini-round"

Estimated playing time: 20 minutes for class 6

Title: "Battleship," Activity name: "Regain Island"

Estimated playing time: 35 minutes for class 6

In case 2, the activity specifying unit 248 specifies an activity for which the estimated playing time is equal to or shorter than the remaining time (30 minutes), as follows:

Title: "Combat Field," Activity name: "Attack on Enemy troops"

Estimated playing time: 30 minutes for class 6

Title: "Ultra Golf," Activity name "Mini-round"

Estimated playing time: 20 minutes for class 6

The provision unit 250 provides information regarding each of the activities specified by the activity specifying unit 248, to the information processing device 10 of the user X. The information regarding each of the activities includes information indicating that the activity is predicted to be completed by the user X by the game play end time, in addition to information for specifying each activity.

Figure 15:
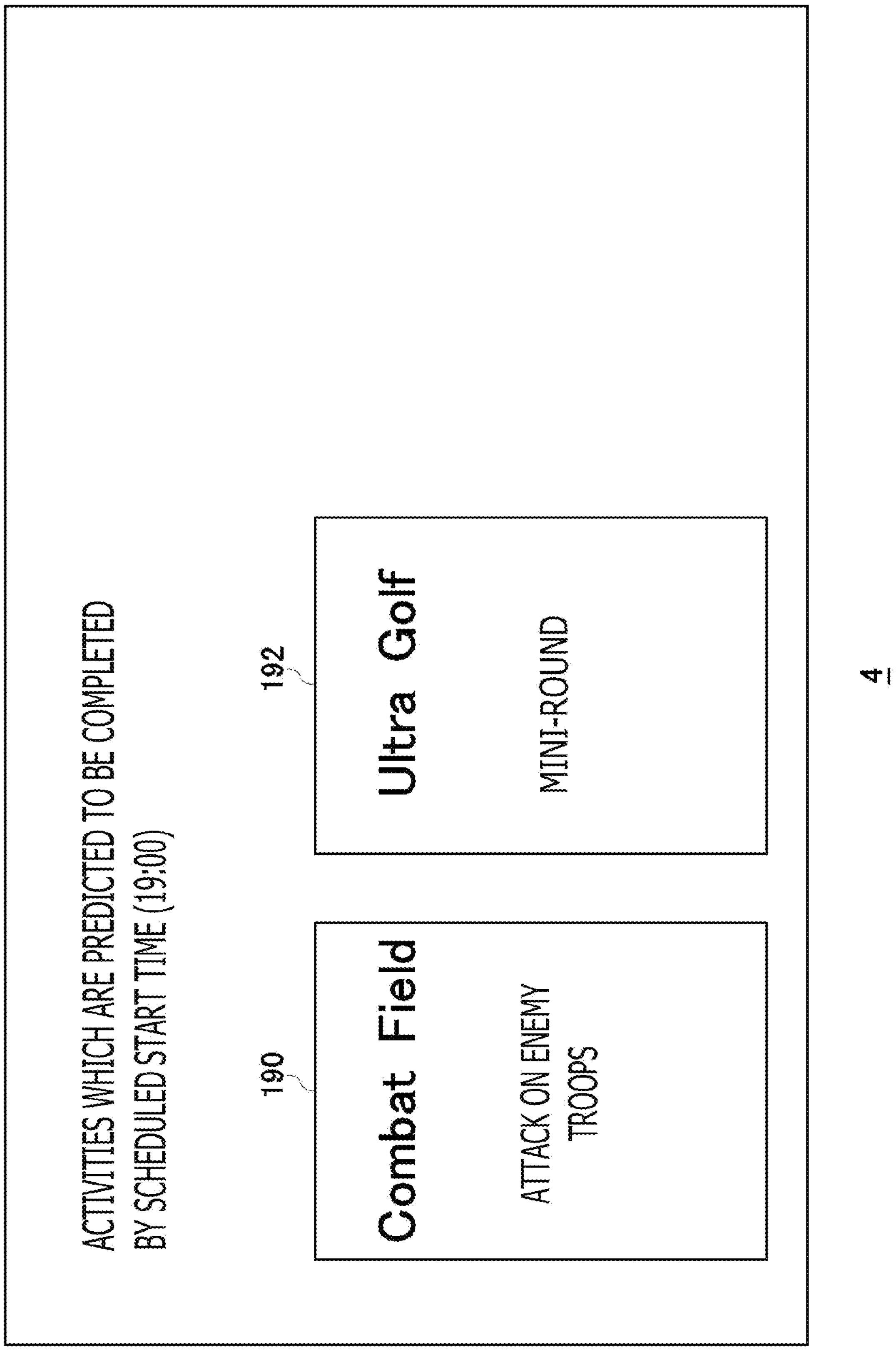
FIG. 15 is a diagram depicting an example of a system screen.

FIG. 15 depicts an example of a system screen which is displayed on the output device 4. The information acquisition unit 150 acquires information regarding an activity that is predicted to be completed by the user X by the end time. The display processing unit 140 generates, as information regarding the activity, system images 190 and 192 from the information acquired by the information acquisition unit 150 and displays the system images 190 and 192 on the output device 4. When the user X selects either one of these system images, a game corresponding to the selected system image is automatically started. Accordingly, the user X can play an activity of the game.

In the system images in FIG. 15, the display processing unit 140 does not indicate the estimated playing time. The display processing unit 140 displays information that indicates that the corresponding activity is predicted to be completed by the user X by the game play end time, instead. As a result of this display, the user X can select an activity to play in relief.

Since options of activities for each of which the estimated playing time for a class with a lower skill level than the class of the user X is equal to or shorter than the remaining time are presented to the user X, irrespective of which activity the user X plays, there is a high possibility that the user X can clear the activity by 19:00 at which the online live will start. Therefore, it is possible to reduce the possibility that the user X continues playing the activity after it has passed the start time of the online live.

(Case 3)

In case 2, the activity specifying unit 248 specifies an activity for which the estimated playing time for a class that is lower by predetermined stages than the class of the user X is equal to or shorter than the remaining time. In case 3, the activity specifying unit 248 specifies a class that is lower than the class of the user X by using a standard deviation of the player skill value, and specifies an activity for which the estimated playing time for the lower class is equal to or shorter than the remaining time.

The skill values that have been derived for activities most recently played by the user X are as follows:

Activity A: Skill value 3

Activity B: Skill value 5

Activity C: Skill value 4

Activity D: Skill value 2

Activity E: Skill value 4

Activity F: Skill value 5

Activity G: Skill value 5

Activity H: Skill value 5

Activity I: Skill value 5

Activity J: Skill value 6

The skill value deriving unit 214 averages the skill values derived for the ten activities and calculates the player skill value of the user X to be "4.4."

From the ten skill values, the activity specifying unit 248 calculates the standard deviation a to be "1.11." The activity specifying unit 248 calculates a 95% reliable section to be "player skill value+2σ." In this case, 6.62 (=4.4+2×1.11) is obtained. The classification unit 234 specifies the class with "player skill value+2σ." In this case, the classification unit 234 specifies the player skill value of 6.62 as class 6.

Regarding an activity that can be performed by the user X, the playing time extraction unit 244 extracts, from the representative value recording unit 268, a representative value of the playing time associated with class 6. On the basis of the extracted representative value of the playing time, the activity specifying unit 248 specifies an activity for which the estimated playing time associated with class 6 is equal to or shorter than the remaining time.

Regarding the following activities in the game titles, the playing time extraction unit 244 extracts the estimated playing time associated with class 6, as follows:

Title: "Combat Field," Activity name: "Attack on Enemy troops"

Estimated playing time: 30 minutes for class 6

Title: "Super Tennis," Activity name: "1 Set Match"

Estimated playing time: 40 minutes for class 6

Title: "Ultra Golf," Activity name: "Mini-round"

Estimated playing time: 20 minutes for class 6

Title "Battleship," Activity name: "Regain Island"

Estimated playing time: 35 minutes for class 6

In case 3, the activity specifying unit 248 specifies activities for each of which the estimated playing time is equal to or shorter than the remaining time (30 minutes), as follows.

Title: "Combat Field," Activity name: "Attack on Enemy troops"

Estimated playing time: 30 minutes for class 6

Title: "Ultra Golf," Activity name: "Mini-round"

Estimated playing time: 20 minutes for class 6

The provision unit 250 provides information regarding the activities specified by the activity specifying unit 248 to the information processing device 10 of the user X. The display processing unit 140 displays the system images which are indicated in FIG. 15 on the output device 4, and the user X selects either one of the system images 190 and 192. Accordingly, the user X is allowed to play the activity of the game corresponding to the selected system image, in the same manner as in case 2.

The present disclosure has been explained so far on the basis of the embodiment. This embodiment exemplifies the present disclosure. A person skilled in the art will understand that the constituent components and combinations of the process steps of the embodiment can be modified in various ways, and that the obtained modifications are within the scope of the present disclosure.

In the embodiment, the time setting unit 218 sets a game play end time of the user on a scheduled date by checking a user's schedule. In a case where an allowable playing time period is set for a user through a parental control function, the time setting unit 218 may set a game play end time of the user on the basis of the remaining time during which the user is allowed to play the game.

Further, in the embodiment, the provision unit 250 provides information regarding an activity that is predicted to be completed by a user by the end time, to the information processing device 10 of the user. In a modification thereof, the activity specifying unit 248 may specify an activity that has a possibility of not being completed by the user by the game play end time, and the provision unit 250 may provide, as information regarding the activity, information for specifying the relevant activity and information indicating that there is a possibility that the activity is not completed by the user by the game play end time, to the information processing device 10 of the user.

In the information processing device 10, the information acquisition unit 150 may simultaneously acquire information regarding an activity that is predicted to be completed by a user by a game play end time, and information regarding an activity that has a possibility of not being completed by the user by the game play end time. In this case, it is preferable that the display processing unit 140 display, on the output device 4, the information regarding an activity that is predicted to be completed, in preference to the information regarding an activity that has a possibility of not being completed by the user by the game play end time. In a case where the display processing unit 140 displays system images as information regarding activities as in the embodiment, the system image of an activity that is predicted to be completed may be displayed closer to the left side (i.e., the forward side in the arrangement direction) than the system image of an activity that has a possibility of not being completed, in the arrangement direction (from the left side to the right side of the screen) of the system images. Since the system image of an activity that is predicted to be completed is preferentially displayed from the left side of the screen, the user is likely to select an activity that can be completed in the remaining time.

It is to be noted that, in a case where the display processing unit 140 displays a system image of an activity that has a possibility of not being completed, the display processing unit 140 displays information indicating that there is a possibility that the activity is not completed by the end time as well. Since information indicating that there is a possibility that the activity is not completed by the end time, the user can select the activity while recognizing that the activity will not be completed by the game play end time (scheduled start time).

It is to be noted that, in a case where a player skill value of a user may not be calculated because the user has just joined the information processing system 1 (the user has not played ten activities), the activity specifying unit 248 specifies an activity that is predicted to be completed by the user in the remaining time, by checking the playing time of a player whose game skill is equal to or lower than the average skill. For example, playing time associated with class 10 may be adopted as the playing time of a player whose game skill is equal to or lower than the average skill.

What is claimed is:

1. A server device comprising:

one or more processors having hardware, wherein the one or more processors are configured to perform operations comprising:

receiving, from a user terminal, schedule information indicating a user-specified end time for game play;

deriving, based on a current time and the user-specified end time, a remaining time that is left until a user ends game play;

accessing historical activity performance data for a plurality of users;

determining, for the user, a skill class by statistically analyzing skill values derived from prior activities;

for each of a plurality of candidate activities, retrieving a representative playing time associated with a class having a lower skill value than the user's skill class;

specifying an activity for which an estimated playing time of the activity is equal to or shorter than the remaining time, wherein the estimated playing time is associated with a class having a lower skill value than a class of the user;

generating interface data that arranges and presents the specified activity; and providing, automatically and in real time, information regarding the specified activity to the user.

2. The server device according to claim 1, wherein the estimated playing time is determined using a reliability interval based on a standard deviation of the skill value.

3. The server device according to claim 1, wherein the one or more processors arrange a display of information regarding activities such that activities predicted to be completed by the user by an end of the remaining time are visually distinguished from activities not predicted to be completed, by arranging the activities predicted to be completed are displayed on a user interface in a preferred position or order relative to activities not predicted to be completed by the end of the remaining time.

4. The server device according to claim 1, wherein the one or more processors are further configured to:

provide, to the user-terminal, information indicating that the specified activity is predicted to be completed by the user by the user-specified end time, and wherein the information comprises a notification or graphical indication in the user terminal.

5. The server device according to claim 1, wherein the one or more processors are further configured to:

identify an activity that has a probability of not being completed by the user by the remaining time, based on a statistical analysis of skill values and representative playing times; and provide, to the user terminal, information indicating an existence of such activities and their associated probabilities or risk levels.

6. An information processing device that is operated by a user, the information processing device comprising:

one or more processors having hardware, wherein the one or more processors;

transmit schedule information indicating a user-specified end time for gameplay;

receive information regarding at least one activity predicted to be completed by the user by the end time, the prediction being based on a user's skill class and historical activity performance data; and display the information regarding the activity, wherein the display prioritizes activities predicted to be completed by the user by the end time over activities not predicted to be completed by the end time, by arranging the activities in a preferred position or order in a user interface.

7. The information processing device according to claim 6, wherein the one or more processors are further configured to:

receive information regarding activities that have a possibility of not being completed by the user by the end time, such possibility being determined based on a reliability interval or statistical analysis of skill values, and display the information regarding activities in a preferred position or order with respect to information regarding activities with lower completion probability.

8. An information providing method for providing information to a user, the method comprising:

receiving, from a user terminal, schedule information indicating a user-specified end time for game play;

deriving, based on a current time and the user-specified end time, a remaining time left until a user ends game play;

accessing historical activity performance data for a plurality of users;

determining, for the user, a skill class by statistically analyzing skill values derived from prior activities;

specifying an activity for which an estimated playing time of the activity is equal to or shorter than the remaining time, wherein the estimated playing time is associated with a class having a lower skill value than a class of the user;

generating interface data that arranges and presents the specified activity; and providing, automatically and in real time, information regarding the specified activity to the user.

* * * * *